United States Patent [19]

Brakke

[11] 4,070,810
[45] Jan. 31, 1978

[54] CUTTING APPARATUS

[76] Inventor: Henry Donald Brakke, Hickson, N. Dak. 58044

[21] Appl. No.: 714,040

[22] Filed: Aug. 13, 1976

[51] Int. Cl.$^2$ .............................................. A01D 55/24
[52] U.S. Cl. ........................................................ 56/291
[58] Field of Search ................ 56/290, 291, 292, 244, 56/245

[56] References Cited

U.S. PATENT DOCUMENTS

| 395,493 | 1/1889 | Hanson | 56/291 |
|---|---|---|---|
| 1,851,840 | 3/1932 | Huff | 56/292 |
| 2,488,886 | 11/1949 | Young | 56/291 |
| 3,029,584 | 4/1962 | Johnson | 56/291 |
| 3,641,752 | 2/1972 | Ipbach | 56/291 |
| 3,681,901 | 8/1972 | Buchele et al. | 56/13.6 |

Primary Examiner—Russell R. Kinsey
Attorney, Agent, or Firm—Burd, Braddock & Bartz

[57] ABSTRACT

A combine header has a transverse platform carrying a cutting apparatus. An elongated auger having reverse spiral flights move cut material along the platform to a feed housing. The cutting apparatus has a base carrying forwardly projected guards located on 2-inch longitudinal centers. An endless chain carrying knife blades is trained about sprockets located adjacent opposite ends of the base. The knife blades are located on three-inch longitudinal centers. The forward run of the chain moves through a passage in a housing secured to the base behind the guards. The knife blades move over the wear plates attached to the guards to cut material located between the guards. A removable inverted U-shaped insert is located in the passage providing a bearing surface for the front run of the chain and a hold-down lip bearing on the knife blades to hold the blades in close relationship with the wear plates. A hydraulic motor connected to a hydraulic pressure source drives the chain to move the knife blade relative to the guards.

44 Claims, 8 Drawing Figures

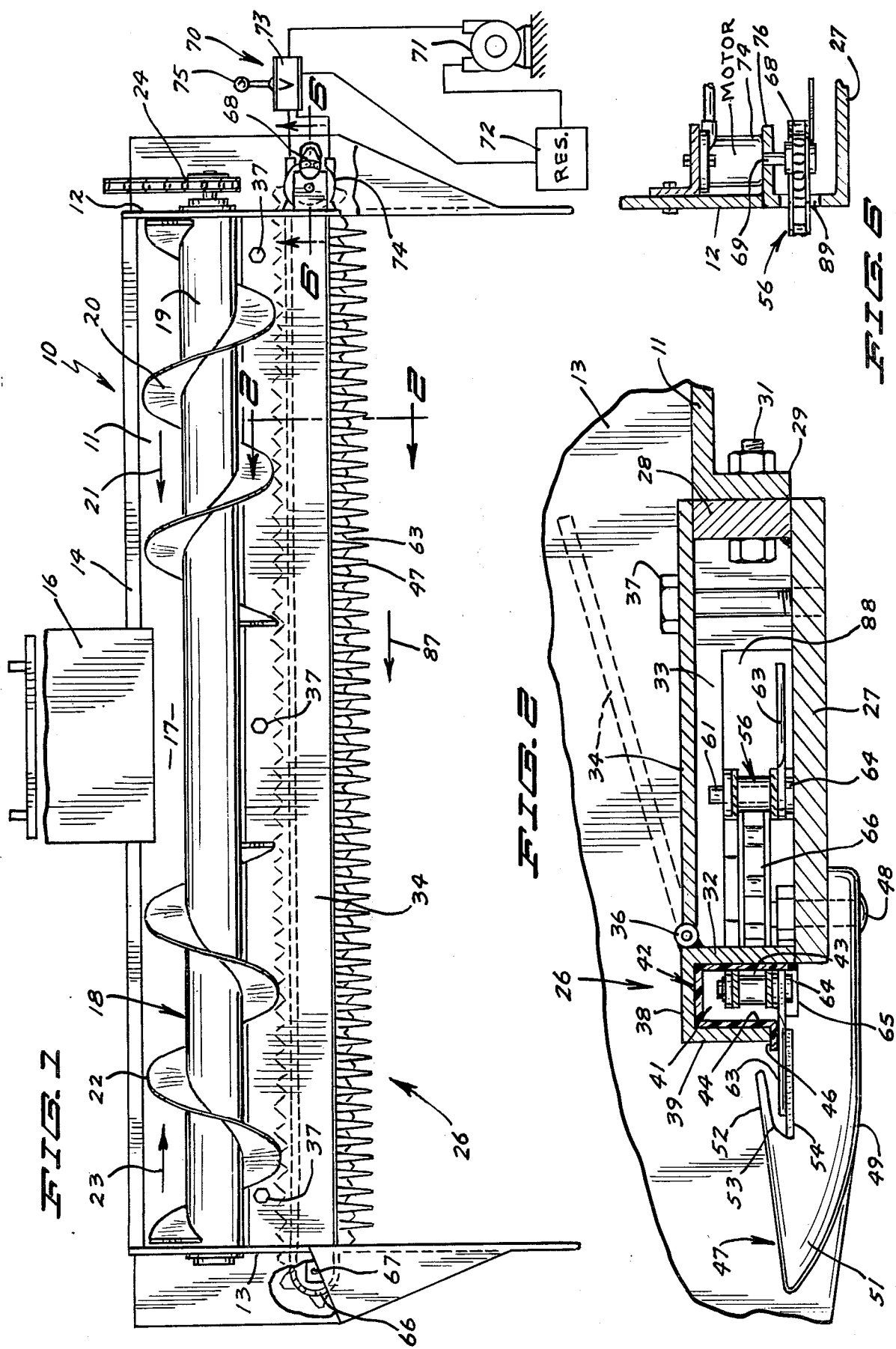

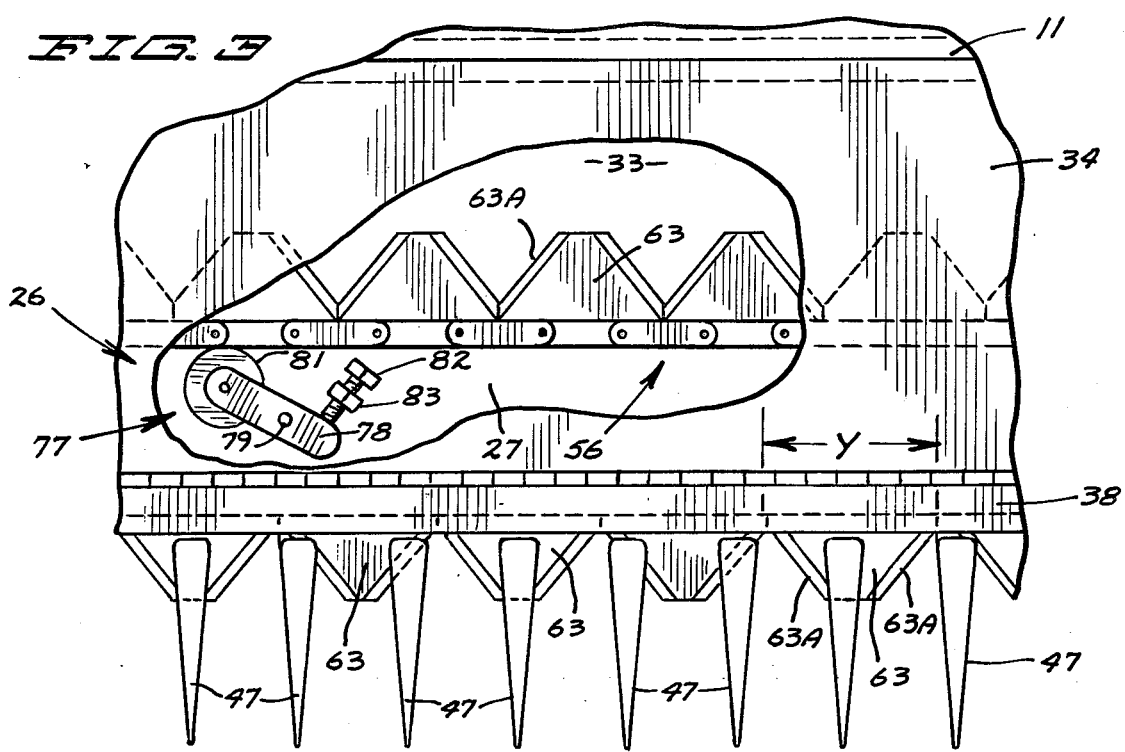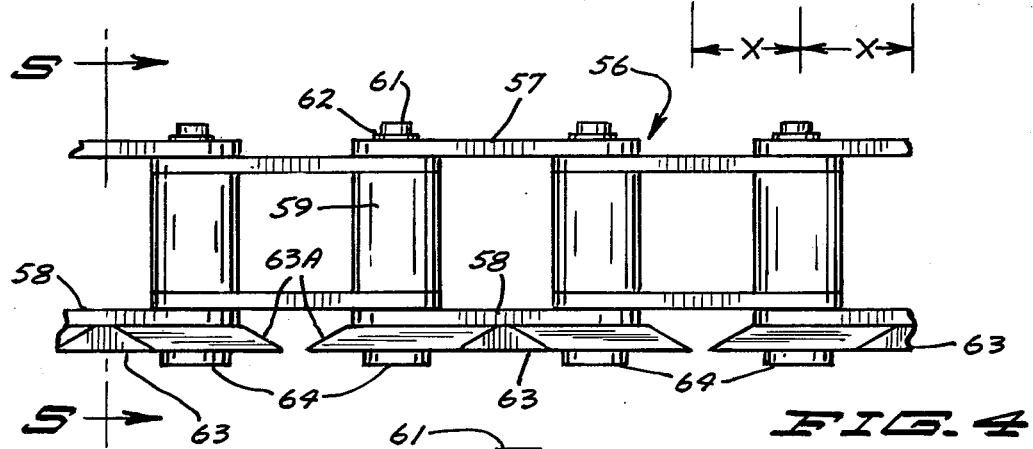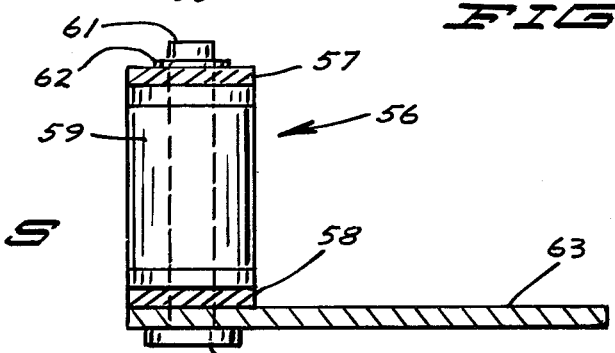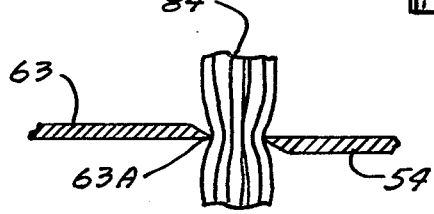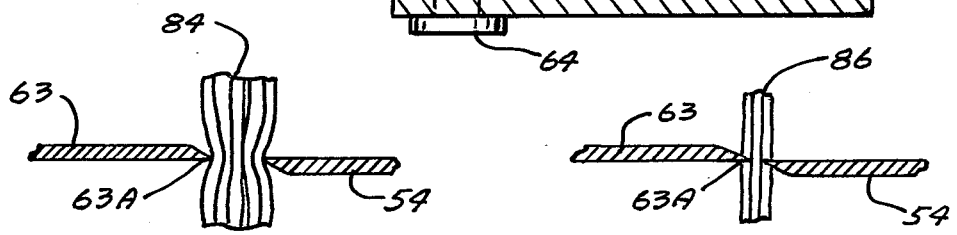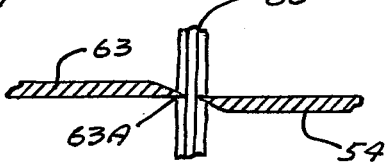

CUTTING APPARATUS

BACKGROUND OF THE INVENTION

The conventional combine cutters utilize a plurality of reciprocating knife blades in conjunction with three-inch center guards. This type of cutter causes the plants to be bent forwardly and slidewardly and crowds or bunches the plants as the knife moves relative to the guards. The sideward movement of the stems of the plants causes the plants to be inclined in alternate directions from left to right as they fall rearwardly onto the platform of the header. This arrangement can cause bunching and uneven feeding by the feed augers of the header. The use of 3-inch knives with 3-inch center guards causes a considerable amount of material to be gathered and bunched between adjacent guards for cutting. This large amount of material is initially compressed before it is severed by the moving blade in conjunction with the wear plate cutting edge on the guard. This requires considerable power to be applied to the sickle bar to cut the plants and causes further random orientation of the cut plants as they move rearwardly onto the platform.

Endless chains carrying a plurality of cutting knives that move relative to guards were first introduced by Sweet in 1874 in U.S. Pat. No. 157,243. Additional endless chain cutting mechanisms for mowing machines and harvesters are shown in the following patents:

U.S. Pat. No. 259,757 — Guptill — June 20, 1882
U.S. Pat. No. 369,096 — Brown — Aug. 30, 1887
U.S. Pat. No. 437,943 — Spratt — Oct. 7, 1890
U.S. Pat. No. 682,875 — Love — Sept. 17, 1901
U.S. Pat. No. 970,019 — Grosthwait — Sept. 13, 1910
U.S. Pat. No. 1,000,949 — Rosean — Aug. 15, 1911
U.S. Pat. No. 1,053,289 — Jacobs et al — Feb. 18, 1913
U.S. Pat. No. 1,057,392 — Helgeson — Mar. 25, 1913
U.S. Pat. No. 1,851,840 — Huff — Aug. 29, 1930
U.S. Pat. No. 2,714,280 — Baker — Oct. 12, 1954
U.S. Pat. No. 2,821,060 — Schoffner — Nov. 24, 1954
U.S. Pat. No. 2,941,345 — Schaeffer — June 7, 1957
U.S. Pat. No. 2,948,099 — Johnson — Nov. 21, 1958
U.S. Pat. No. 3,029,584 — Johnson — Apr. 20, 1960
U.S. Pat. No. 3,561,202 — Tupper — Feb. 9, 1971
U.S. Pat. No. 3,681,901 — Buchele et al — Aug. 8, 1972

SUMMARY OF THE INVENTION

The invention is directed to a cutting apparatus usable with a mowing machine or harvester such as a combine header for cutting agricultural plants or crops such as small grains, soybeans, flax, alfalfa, clover and the like. The cutting apparatus has an elongated base having front and rear upright walls forming an elongated transverse chamber. A cover pivotally mounted on one of the walls closes the chamber. A housing attached to the forward wall has a transverse passage having an open bottom. A plurality of guards are secured to the base. An endless chain carrying cutting knife blades is trained about sprockets located adjacent opposite ends of the base. The chain has a front run that moves through the passage in the housing and a rear run that moves through the chamber below the cover. An inverted generally U-shaped insert is located in the passage of the housing and forms a bearing surface for the chain. The insert has a forwardly directed lower hold-down lip engageable with the top surface of the knife blades to retain the knife blades in a close or contiguous relationship with respect to the wear plates secured to the guards. The slack of the chain is adjusted by chain tighteners located in the chamber below the cover. The chain is driven by a hydraulic motor connected to a hydraulic fluid pressure system. The fluid pressure system includes control valve structure which enables the operator to control the speed of the chain as well as direction of movement of the chain.

An object of the invention is to provide a cutter assembly having an endless chain carrying a plurality of cutter knives that can be mounted on a conventional header with a minimum of time and effort. A further object of the invention is to provide a cutter apparatus having forwardly directed guards and an endless chain carrying cutting knife blades that are driven relative to the guards to cut material located between adjacent guards within an effective and efficient manner with a minimum of power. Yet another object of the invention is to provide a cutting apparatus with a housing having a passageway for accommodating an endless chain carrying cutting knife blades and a removable wear insert having a portion for holding the cutting blades in a contiguous cutting relationship relative to wear plates of guards. A further object of the invention is to provide a cutting apparatus that has an endless chain carrying cutting knife blades with a chamber that is closed with a top cover that can be opened to provide convenient access to the chain whereby the chain can be serviced and repaired. Yet a further object of the invention is to provide a cutter assembly having guards and cutting knife blades located on longitudinal centers with the centers of the guards having a lateral space less than the lateral space of the centers of the knife blades.

IN THE DRAWINGS

FIG. 1 is a top plan view of a combine header equipped with the cutting assembly of this invention;

FIG. 2 is an enlarged sectional view taken along the line 2—2 of FIG. 1;

FIG. 3 is an enlarged plan view, partly broken away, of the cutter assembly of FIG. 1;

FIG. 4 is a front elevational view of the chain and knife structure of the cutter assembly;

FIG. 5 is an enlarged sectional view taken along the line 5—5 of FIG. 4;

FIG. 6 is an enlarged sectional view taken along line 6—6 of FIG. 1;

FIG. 7 is a diagrammatic vertical sectional view of a conventional cutting assembly with a moving knife on a sickle bar; and FIG. 8 is a diagrammatic vertical sectional view showing the cutting of the cutting assembly of the invention.

DETAILED DESCRIPTION OF PREFERRED EMBODIMENT

Referring to FIG. 1, there is shown a combine header indicated generally at 10 detached from a combine. Header 10 has a generally transverse horizontal platform 11 joined to upright side walls 12 and 13. The rear of the platform is secured to a transverse upright rear wall 14. A feed housing 16 is secured to the center of the platform 11 and rear wall 14. Platform 11, upright side walls 12 and 13, and rear wall 14 form a transverse trough area 17 for guiding material, as small grains, soybeans, flax and the like, to the feed housing 16. A transverse auger indicated generally at 18 extends between side walls 12 and 13. Auger 18 comprises a transverse tube 19 carrying a first spiral flight 20 for moving the material in the trough area 17 in the direction of the arrow 21. A second spiral flight 22 mounted on the opposite end of the tube 19 functions to move the material in the direction of the arrow 23 towards the feed housing 16. Suitable bearings (not shown) mount opposite ends of the tube 19 on the side walls 12 and 13 respectively. A drive mechanism 24, as a chain and sprocket assembly, functions to transmit the power from the combine to rotate the auger 18.

A cutting apparatus indicated generally at 26 extends along the front of platform 11. As shown in FIG. 2, cutting apparatus 26 has a flat transverse base or bottom plate 27. Plate 27 is secured by weld or the like to an upright rear wall 28. Wall 28 is located adjacent a downwardly directed transverse lip 29 on the forward edge of the platform 11. A plurality of nut and bolt fasteners 31 extend through the wall 28 and lip 29 to secure the cutting apparatus 26 to the platform. Cutting apparatus 26 extends the full length of platform 11, as shown in FIG. 1, and functions to cut the crop material, as small grains, soybeans, flax and the like. The cut material moves over the cutting apparatus 26 onto the platform 11. The auger 18 delivers the material to the inlet of the feed housing 16.

Returning to FIG. 2, an upright front wall 32 is secured to the front edge of base 27. The base 27 and walls 28 and 32 form an elongated relatively flat transverse chamber 33. A transverse flat cover 34 closes the top of chamber 33 so that the cut material, weeds, dirt and the like do not collect in chamber 33. A hinge 36 secured to the top of wall 32 pivotally connects the cover 34 to the wall 32. A plurality of bolts 37 extended through holes in the rear portion of cover 34 are threaded into the base 27 to hold the cover 34 in a closed position. The bolts 37 can be removed whereby the cover can be pivoted to an open position, shown in broken lines, exposing the top of chamber 33.

A housing 38 is secured to the top of the front of wall 32. Housing 38 is a generally right angle member having a downwardly directed flange or forward wall 39 spaced from wall 32. The housing 38 forms, with wall 32, a transverse passage 41. An inverted U-shaped insert indicated generally at 42 is located in the passage 41 providing a bearing surface for the cutting structure hereinafter described. Insert 42 has a rear wall 43 in engagement with the front surface of wall 32 and a front wall 44 in engagement with the inside surface of flange 39. The bottom edge of wall 43 bears against the top of the rear portion of guards 47. The wall 44 terminates in a forwardly directed transverse flat lip 46 which serves as a hold-down member or flange for the moving cutting knife blades 63. In the event of wear or breakage, insert 42 can be replaced by removing the guards 47 and chain 56. Insert 42 can be a rigid wear resistant member made from hard plastic or metal.

As shown in FIGS. 1, 2 and 3, the cutting apparatus 26 has a plurality of forwardly directed guards indicated generally at 47. Nut and bolt fasteners 48 secure the guards to the forward portion of base 27. Each guard has a body 49 terminating in a forwardly directed pointed nose 51. An ear 52 extends upwardly and rearwardly from the nose forming a cavity 53. A replaceable wear plate 54 having side cutting edges is mounted on the body and forms the bottom of cavity 53. The rear end of ear 52 is spaced from flange 39 to permit material to move between the ear 52 and the flange 39 thereby minimizing the accumulation and clogging of material in the guards.

An endless roller link chain 56 has a front run that moves through the passage 41 and a rear or return run that moves through the chamber 33. Referring to FIGS. 4 and 5, chain 56 has side links 57 and 58 spaced from each other with rollers 59. Pins 61 pivotally connect the adjacent links to each other and rotatably mount the rollers 59 between the links 57 and 58. Snap rings 62 are releasably mounted on the free or straight ends of the pins 61 to hold the pins 61 in assembled relation with the links 57 and 58. Pins 61 also mount knife blades 63 on links 58. Pins 61 have enlarged heads 64 which hold the blades 63 on chain 56. Pins 61 extend through holes in the base section of each blade 63. The heads 64 bear against the bottom side of each blade to hold the blade in firm engagement with link 58. As shown in FIG. 4, two pins 61 mount each blade 63 on chain 56. As shown in FIG. 2, heads 64 ride in a transverse groove 65 in the top of the body 49 of each guard.

The knife blades 63 are the conventional sickle knives having a triangular shape with converging cutting edges 63A. The width of the base of each blade 63 is approximately three inches and is represented by the dimension Y in FIG. 3. The guards 47 are spaced along longitudinal lines that are separated from each other by a distance X. Preferably, the distance X is two inches. In other words, the spacing between adjacent guards is less than the width of the base of a knife blade 63A adjacent knife blades 63 are laterally spaced from each other along longitudinal center lines having a lateral distance greater than the lateral space between the longitudinal center lines of adjacent guards. This increases the number of stationary cutting edges per linear foot of the cutting edges 63A providing a more efficient and low power cutting of the crop material.

FIG. 7 shows a conventionally spaced guard with a cutting knife 63 of a moving sickle bar. The crop material 84 accumulates and bunches in the space between adjacent guards. The moving knife blades 63 compress the bunched crop material 84 prior to its cutting between a cutting edge 63 and the adjacent cutting edge of the guard wear plate 54. This causes high shear or cutting forces on the knife blades, thereby increasing the power input required to operate the sickle bar.

FIG. 8 shows the cutting arrangement of the invention wherein the amount of crop material 86 is substantially reduced as compared to FIG. 7. The cutting edges 63A of knife 63 in the adjacent edge of the wear plate 54 are closer together, minimizing the bunching of crop material between adjacent guards. The reduced amount of material between the guards and the increased number of wear plate cutting edges provides an effective and efficient cut. The power required to cut the crop material has been found to be substantially reduced from the power used with a conventional sickle bar.

Returning to FIGS. 1 and 2, the chain 56 is trained about an idler sprocket 66 mounted on the outer end of the header 10. Sprocket 66 is rotatably supported on a bracket 67 with suitable bearings (not shown). Bracket 67 is a U-shaped frame secured to the outer end of base 27. A hydraulic drive motor (not shown) can be connected to the shaft carrying the sprocket 66. The motor connected to a hydraulic pressure source is operable to move the front run of chain 56 in an outward direction. The opposite end of chain 56 is trained about a drive sprocket 68. Sprocket 68 is mounted on a drive shaft 69 rotatably mounted with suitable bearings on a bracket 76. Bracket 76 is secured to the inner end of base 27, and a drive coupling can be used to connect sprocket 68 to the hydraulic motor 74. Bracket 76 is a U-shaped frame having a pair of bearings (not shown) carrying the shaft 69. The hydraulic motor 74, as an orbit hydraulic motor, is mounted on bracket 76 and side wall 12.

A hydraulic drive system indicated generally at 70 in FIG. 1 functions to deliver rotational power to shaft 69. Hydraulic drive system 71 comprises a hydraulic pump 71 driven by the combine power unit. Pump 71 draws hydraulic fluid from a reservoir 72 and delivers the hydraulic fluid under pressure to a control valve 73. The control valve functions to direct the hydraulic fluid under pressure to a hydraulic motor 74 via appropriate hydraulic lines and divert return hydraulic fluid from the motor 74 back to the reservoir 72. The control valve 73 has a control lever 75 that is operable by the operator of the vehicle to vary the speed of the hydraulic motor. Motor 74 can be connected to sprocket 66 and operated in the reverse direction whereby chain 56 is driven in the opposite direction.

Returning to FIG. 3, a slack adjuster or chain tightener 77 functions to adjust and maintain the tension on the chain 56. Slack adjuster 77 comprises a movable arm 78 that is pivoted on a pivot member 79 secured to base 27. A roller 81 is rotatably mounted on one end of arm 78 and engages the inside of chain 76. An adjusting bolt 82 bears against the end of the arm 78 opposite roller 81 to hold the roller in engagement with chain 56. Bolt 82 is threaded to a fixed tab 83 secured to base 27. The amount of tension on chain 56 is controlled by a bolt 82. A plurality of slack adjusters or chain tighteners can be used to adjust the tension of chain 56. Slack adjuster 77 is located in chamber 33 below cover 34. When cover 35 is opened, the rear run of chain 56 and the slack adjuster 77 is accessible for servicing, repair or replacement.

In use, the operator of the combine moves the control valve lever 75 thereby permitting hydraulic fluid under pressure from pump 71 to flow to the hydraulic motor 74. The motor 74 drives the chain 76 in the direction of the arrow 87, shown in FIG. 1. The knife blades 63 secured to the chain 56 move through the guards 47. The back or rear run of the chain moves through the chamber 33 below cover 34 thereby moving the rear run of the chain through a confined passage minimizing the accumulation and clogging of the chain by crop material as soil, weeds and the like. The side walls 12 and 13 have suitable openings 88 and 89, respectively, adjacent the sprockets 66 and 68 to permit the rear run of chain 56 to move through the walls 12 and 13. The front or forward run of chain 56 moves through the transverse passage 41. The rear portion of the front run or cutting run of chain 56 and knife blades 63 rides on the rear wall 43 of the wear insert 42. The head 64 of the pin 61 follows along the grooves or recesses 65 in the guards 47. The knife blades 63 are held in sliding engagement with the top surfaces of the wear plates 54 by the hold-down lip 46. The blades 63 extend into the cavities or pockets 53 below the ears 52 of the guards.

The header 10 is moved in a forward direction in front of the combine. The plant material to be cut, as small grains, soybeans, flax, and the like, move between adjacent guards. The moving chain 54 moves the knife blades 63 in a direction generally transverse to the cutting edges of the wear plates 54. This shearing action on the plant material cuts the plant material. The cut portions of the plant material fall rearwardly into the trough area 17 of the header. The auger 18 functions to move the cut material into the inlet of the feeding housing 16. The material moves from the feeding housing 16 into the combine.

While there has been shown and described a preferred embodiment of the cutting apparatus for a combine header, it is understood that changes in the structures, materials and arrangement of structure can be made by those skilled in the art without departing from the invention.

The embodiments of the invention in which an exclusive property or privilege is claimed are defined as follows:

1. A cutting apparatus usable with a combine header having a horizontal platform for receiving cut material comprising: an elongated base, an upright rear wall secured to the base adapted to be attached to the platform, an upright front wall secured to the base forming with the base and rear wall a chamber, a cover for closing the top of the chamber, means pivotally mounting the cover on the front wall, means releasably connecting the cover to the base allowing the cover to be moved to an open position, a housing having inside surfaces forming a passage secured to the front wall, said passage extended along said front wall, said housing having a bottom edge and an open bottom open to the passage, an inverted U-shaped insert located within the passage in engagement with the inside surfaces of the housing and the front wall, said insert having a forwardly directed lip extended under the bottom edge of said housing, a plurality of guards secured to the base, each guard having a wear plate with side cutting edges, an idler sprocket rotatably mounted adjacent one end of the base, a drive sprocket rotatably mounted adjacent the opposite end of the base, an endless chain trained about the idler sprocket and drive sprocket, a plurality of knife blades secured to the chain and extended outwardly away from the chain, each blade having a generally triangular shape with converging side cutting edges, said chain having a front run located in the passage of the insert with the blades engageable with the bottom of the lip and the top of the wear plates and a rear run located in the chamber below the cover, and means to drive the drive sprocket whereby said chain and knife blades move relative to the guards and the cutting edges of the blades move relative to the side cutting edges of the wear plates so as to cut material located between adjacent guards.

2. The cutting apparatus of claim 1 wherein: adjacent knife blades are laterally spaced from each other along longitudinal center lines having a lateral distance greater than the lateral space between the longitudinal center lines of adjacent guards.

3. The cutting apparatus of claim 2 wherein: the lateral distance between the longitudinal center lines of adjacent guards is about 2 inches.

4. The cutting apparatus of claim 3 wherein: the lateral distance between the longitudinal center lines of adjacent knife blades is about 3 inches.

5. The cutting apparatus of claim 1 wherein: the base is a flat plate.

6. The cutting apparatus of claim 1 wherein: the insert is a plastic member.

7. The cutting apparatus of claim 1 including: fastening means attaching the guards to the base, and fastening means having releasable means located in the chamber whereby the guards can be removed from the base.

8. The cutting apparatus of claim 1 including: means located in the chamber engageable with the chain to adjust and maintain the chain in tension.

9. The cutting apparatus of claim 1 wherein: the chain has a plurality of pins for attaching the knife blades to the chain, each pin having a head engageable with the bottom blade, each guard having a groove to accommodate the heads of the pins.

10. The cutting apparatus of claim 1 wherein: the means to drive the drive sprocket includes a hydraulic motor connected to the drive sprocket, and means to supply hydraulic fluid under pressure to the hydraulic motor.

11. A cutting apparatus for cutting material as field crops comprising: an elongated base, a member secured to the base, a housing having inside walls forming a passage secured to said member, said passage extended along said member and being open along the bottom thereof, a plurality of forwardly directed guards secured to the base, each guard having side cutting edges, a first sprocket rotatably mounted adjacent one end of the base, a second sprocket rotatably mounted adjacent the opposite end of the base, an endless chain trained about the first and second sprockets, a plurality of knife blades secured to the chain and extended outwardly away from the chain, each blade having side cutting edges, said chain having a front run located in the passage with the blades engageable with the guards and a rear run located behind said member, adjacent knife blades being located along longitudinal center lines having a lateral distance greater than the lateral space between the longitudinal center lines of adjacent guards, means mounted on the housing engageable with the blades to hold the blades in contiguous relationship with the guards, and means to drive at least one of the sprockets whereby said chain and knife blades move relative to the guards and the cutting edges of the blades move relative to the side cutting edges of the guards so as to cut material located between adjacent guards.

12. The cutting apparatus of claim 11 wherein: the lateral distance between the longitudinal center lines of adjacent guards is about 2 inches.

13. The cutting apparatus of claim 11 wherein: the lateral distance between the longitudinal center lines of adjacent knife blades is about 3 inches.

14. The cutting apparatus of claim 11 including: fastening means attaching the guards to the base, said fastening means having releasable means located adjacent the top of the base behind the upright wall whereby the guards can be removed from the base.

15. The apparatus of claim 11 wherein: the chain has a plurality of pins for attaching the knife blades to the chain, each pin having a head engageable with the bottom of a blade, each guard having a groove to accommodate the heads of the pins.

16. The cutting apparatus of claim 11 wherein: the means to drive at least one of the sprockets includes a hydraulic motor connected to the one of the sprockets, and means to supply hydraulic fluid under pressure to the hydraulic motor.

17. A cutting apparatus for cutting material, as field crops, comprising: an elongated base, a member secured to the base, a housing having inside walls forming a passage secured to said member, said passage extended along said member and being open along the bottom thereof, a plurality of forwardly directed guards secured to the base, each guard having side cutting edges, a first sprocket rotatably mounted adjacent one end of the base, a second sprocket rotatably mounted adjacent the opposite end of the base, and endless chain trained about the first and second sprockets, a plurality of knife blades secured to the chain and extended outwardly away from the chain, each knife blade having side cutting edges, said chain having a front run located in the passage with the blades engageable with the guards and a rear run located behind said member, adjacent knife blades being located along longitudinal center lines having a lateral distance greater than the lateral space between the longitudinal center lines of adjacent guards, an insert located within the passage in engagement with the inside walls of the housing and the member, said front run of the chain riding on a portion of the insert as it moves through said passage of the housing, and means to drive at least one of the sprockets whereby said chain and knife blades move relative to the guards and the cutting edges of the blades move relative to the side cutting edges of the guards so as to cut material located between adjacent guards.

18. The cutting apparatus of claim 17 wherein: said insert has a forwardly directed lip engageable with the top surfaces of the cutting blades to hold the cutting blades in contiguous relationship relative to the portions of the guards having the side cutting edges.

19. A cutting apparatus for cutting material comprising: an elongated base, a member secured to the base, a housing having a bottom edge and inside walls forming a passage secured to the member, said passage extended along said member, and being open along the bottom thereof, an insert located within the passage in engagement with at least one of said inside walls of the housing and the member, said insert having means extended under the bottom edge of said housing, a plurality of guards secured to the base, each guard having portions with side cutting edges, a first sprocket rotatably mounted adjacent one end of the base, a second sprocket rotatably mounted adjacent the opposite ends of the base, an endless chain trained about the first and second sprockets, a plurality of knife blades secured to the chain and extended outwardly away from the chain, each blade having side cutting edges, said chain having a front run located in the passage of the insert with the blades engageable with the means of the insert and the portions of the guards having the side cutting edges, and a rear run located behind the upright wall, and means to drive at least one of the sprockets whereby said chain and knife blades move relative to the guards and the cutting edges of the blades move relative to the side cutting edges of the wear plate so as to cut material located between the adjacent guards.

20. The cutting apparatus of claim 19 wherein: adjacent blades are laterally spaced from each other along longitudinal center lines having a lateral distance greater than the lateral space between the longitudinal center lines of adjacent guards.

21. The cutting apparatus of claim 20 wherein: the lateral distance between the center lines of adjacent guards is about 2 inches.

22. The cutting apparatus of claim 20 wherein: the lateral distance between the center lines of adjacent knife blades is about 3 inches.

23. The cutting apparatus of claim 19 wherein: the insert is a generally U-shaped plastic member.

24. The cutting apparatus of claim 19 wherein: the means to drive at least one of the sprockets includes a hydraulic motor connected to the one of the sprockets, and means to supply hydraulic fluid under pressure to the hydraulic motor.

25. The cutting apparatus of claim 19 wherein: said insert has a portion engageable with the guards.

26. The cutting apparatus of claim 19 wherein: the means of the insert is an elongated lip located under said housing, said lip being engageable with said blades to hold the blades in contiguous relationship with the portions of the guards having the side cutting edges.

27. The cutting apparatus of claim 19 including: means secured to the base forming with the base a chamber for accommodating the rear run of the endless chain, and cover means mounted on the member for closing the chamber.

28. The cutting apparatus of claim 27 including: pivot means for pivotally mounting the cover means on the member, and means to releasably attach the cover means to the base.

29. The cutting apparatus of claim 18 wherein: said insert has means engageable with the top surfaces of the cutting blades to hold the cutting blades in contiguous relationship relative to the portions of the guards having the side cutting edges.

30. The cutting apparatus of claim 17 wherein: the means to drive at least one of the sprockets includes a hydraulic motor connected to one of the sprockets and means to supply hydraulic fluid under pressure to the hydraulic motor.

31. The cutting apparatus of claim 17 including: means secured to the base forming with the base a chamber for accommodating the rear run of the endless chain, and cover means mounted on the member for closing the chamber.

32. The cutting apparatus of claim 31 including: pivot means for pivotally mounting the cover means on the member, and means to releasably attach the cover means to the base.

33. A cutting apparatus usable with a combine header having a horizontal platform for receiving cut material comprising: an elongated base, a rear wall secured to the base adapted to be attached to the platform, a front wall secured to the base forming with the base and rear wall a chamber, a cover for closing the top of the chamber, means mounting the cover on the front wall, means releasably connecting the cover to the base to allow the cover to be moved to an open position, a housing having inside walls forming a passage secured to the front wall, said passage extended along said front wall and having an open bottom, a plurality of guards secured to the base, each guard having side cutting edges, a first sprocket rotatably mounted adjacent one end of the base, a second sprocket rotatably mounted adjacent the opposite end of the base, an endless chain trained about the first and second sprockets, a plurality of knife blades secured to the chain and extended outwardly from the chain, each knife blade having converging side cutting edges, said chain having a front run located in the passage of the housing with the blade engageable with the guards and a rear run located in the chamber below the cover, means mounted on the housing engageable with the blades to hold the blades in contiguous relationship with the guards, and means to drive at least one of the sprockets whereby said chain and knife blades move relative to the guards and the cutting edges of the blades move relative to the side cutting edges of the guards so as to cut material located between adjacent guards.

34. The cutting apparatus of claim 33 wherein: said means engageable with the cutting blades includes an elongated lip located under said housing, said lip being engageable with said blades to hold the blades in contiguous relationship with portions of the guards having the side cutting edges.

35. The cutting apparatus of claim 33 wherein: adjacent knife blades are laterally spaced from each other along longitudinal center lines having a lateral distance greater than the lateral space between the longitudinal center lines of adjacent guards.

36. The cutting apparatus of claim 33 wherein: fastening means attaching the guards to the base, and fastening means having releasable means located in the chamber whereby the guards can be removed from the base.

37. The cutting apparatus of claim 33 wherein: means located in the chamber engageable with the chain to adjust and maintain the chain in tension.

38. The cutting apparatus of claim 33 wherein: the chain has a plurality of pins for attaching the knife blades to the chain, each pin having a head engageable with the bottom blade, each guard having a groove to accommodate the heads of the pins.

39. The cutting apparatus of claim 33 wherein: the means to drive at least one of the sprockets includes a hydraulic motor connected to the one of the sprockets, and means to supply hydraulic fluid under pressure to the hydraulic motor.

40. A cutting apparatus for cutting material as field crops comprising: an elongated base, a member secured to the base, a housing having an inside wall forming a passage secured to said member said passage extended along said member and being open along the bottom thereof, a plurality of forwardly directed guards secured to the base, each guard having side cutting edges, a first sprocket rotatably mounted adjacent one end of the base, a second sprocket rotatably mounted adjacent the opposite end of the base, and endless chain trained about the first and second sprockets, a plurality of knife blades secured to the chain and extended outwardly away from the chain, each knife blade having side cutting edges, said chain having a front run located in the passage with the blades engageable with the guards and a rear run located behind said member, means mounted on the housing engageable with the blades to hold the blades in contiguous relationship with the guards, and means to drive at least one of the sprockets whereby said chain and knife blades move relative to the guards and the cutting edges of the blades move relative to the side cutting edges of the guards so as to cut material located between adjacent guards.

41. The cutting apparatus of claim 40 wherein: said means engageable with the cutting blades comprises a generally U-shaped insert located with the passage in engagement with the walls of the housing and the member, said first run of the chain riding on a portion of the insert as it moves through said passage.

42. The cutting apparatus of claim 41 wherein: said insert has a forwardly directed lip engageable with the top surfaces of the cutting blades to hold the cutting blades in contiguous relationship relative to the portions of the guards having the side cutting edges.

43. The cutting apparatus of claim 40 wherein: means secured to the base forming with the base a chamber for accommodating the rear run of the endless chain, and cover means mounted on the member for closing the chamber.

44. The cutting apparatus of claim 43 including: pivot means for pivotally mounting the cover means on the member, and means to releasably attach the cover means to the base.

* * * * *

UNITED STATES PATENT AND TRADEMARK OFFICE
CERTIFICATE OF CORRECTION

PATENT NO. : 4,070,810
DATED : January 31, 1978
INVENTOR(S) : Henry Donald Brakke It is certified that error appears in the above-identified patent and that said Letters Patent are hereby corrected as shown below:

Column 1, line 8, "slidewardly" should be -- sidewardly --.

Column 9, Claim 29, line 1, "The cutting apparatus of Claim 18" should be -- The cutting apparatus of Claim 17 --.

Signed and Sealed this

Sixteenth Day of May 1978

[SEAL]

Attest:

RUTH C. MASON
Attesting Officer

LUTRELLE F. PARKER
Acting Commissioner of Patents and Trademarks